(12) United States Patent
Isogawa et al.

(10) Patent No.: US 7,371,193 B2
(45) Date of Patent: May 13, 2008

(54) GOLF BALL

(75) Inventors: Kazuhiko Isogawa, Kobe (JP); Koichi Fujisawa, Kobe (JP); Yoshikazu Yabuki, Kobe (JP)

(73) Assignee: SRI Sports Limited, Kobe (JP)

( * ) Notice: Subject to any disclaimer, the term of this patent is extended or adjusted under 35 U.S.C. 154(b) by 105 days.

(21) Appl. No.: 11/151,252

(22) Filed: Jun. 14, 2005

(65) Prior Publication Data
US 2005/0282660 A1 Dec. 22, 2005

(30) Foreign Application Priority Data
Jun. 21, 2004 (JP) ............................. 2004-182841

(51) Int. Cl.
*A63B 37/12* (2006.01)
(52) U.S. Cl. .................................................... 473/378
(58) Field of Classification Search ................ 473/378, 473/351
See application file for complete search history.

(56) References Cited

U.S. PATENT DOCUMENTS 6,057,403 A * 5/2000 Sullivan et al. ............. 525/221
6,509,410 B2 * 1/2003 Ohira et al. ................. 524/591
2004/0116623 A1 * 6/2004 Isogawa et al. ............. 525/453

FOREIGN PATENT DOCUMENTS

JP 11-146930 * 6/1999
JP 11-146930 A 6/1999

* cited by examiner

*Primary Examiner*—Raeann Trimiew
(74) *Attorney, Agent, or Firm*—Birch, Stewart, Kolasch & Birch, LLP

(57) ABSTRACT

The object of the present invention is to provide a golf ball having a paint film which is obtained from an environment-friendly aqueous paint and is excellent in the impact-resistance and the wear-resistance.

The present invention provides a golf ball having a paint film on a surface of a golf ball body, wherein the paint film is obtained from an aqueous paint, and the paint film has an elongation at break of 80% or more and maximum stress of 170 kgf/cm$^2$ (16.7 MPa) or more.

10 Claims, No Drawings

GOLF BALL

BACKGROUND OF THE INVENTION

1. Field of the Invention

The present invention relates to a golf ball, more particularly to a golf ball having a paint film.

2. Description of the Related Art

A conventional golf ball has a paint film on the surface of the golf ball body. The paint film is formed to prevent the deterioration of the golf ball body due to the exposure of the sun light and the weather, as well as impart a gloss to the golf ball body, thereby improving the appearance thereof. For example, Japanese unexamined patent publication No. H11-146930 discloses a golf ball having a solvent-borne paint film containing a urethane polyol and a diisocyanate compound. It is required for the paint film to have an impact-resistance and a wear-resistance. Especially, since hitting the golf ball deforms the golf ball body, the paint film is likely to peel off in the case that the paint film covering the golf ball body does not follow the deformation of the golf ball body (impact-resistance). In addition, high degree of the wear-resistance is required for the golf ball, since the golf ball is subject to the friction against the golf clubs when hitting the golf ball, and against the ground surfaces such as sand of bunker and rough when landing on the ground. In recent years, it has been expected to reduce the usage of the solvent-borne paint in view of the environmental problems, and an aqueous paint has been studied to replace the solvent-borne paint used for the golf ball.

SUMMARY OF THE INVENTION

The golf ball having a paint film made from the aqueous paint, however, is inferior to the golf ball having a paint film made from the solvent-borne paint in terms of the impact-resistance and wear-resistance. The present invention has been achieved in view of the above circumstances. The object of the present invention is to provide a golf ball having a paint film which is obtained from an environment-friendly aqueous paint and is excellent in the impact-resistance and the wear-resistance. The present invention provides a golf ball having a paint film on the surface of the golf ball body, wherein the paint film is obtained from an aqueous paint, and the paint film has an elongation at break of 80% or more and maximum stress of 170 kgf/cm$^2$ (16.7 MPa) or more. The paint film covering the golf ball body and having an elongation at break of 80% or more allows the paint film to follow the deformation of the golf ball when hit, and thus improves the adhesion against the impact (impact-resistance), and the paint film having the maximum stress of 170 kgf/cm$^2$ or more improves the wear-resistance of the paint film.

According to the present invention, it is possible to reduce the usage of the volatile organic solvent to produce a golf ball. In addition, the paint film of the obtained golf ball is excellent in impact-resistance and wear-resistance.

DESCRIPTION OF THE PREFERRED EMBODIMENT

The golf ball of the present invention has a paint film on the surface of the golf ball body, wherein the paint film is obtained from an aqueous paint, and the paint film has an elongation at break of 80% or more and the maximum stress of 170 kgf/cm$^2$ (16.7 MPa) or more. The use of the paint film having an elongation at break of 80% or more enables the paint film to follow the deformation of the golf ball when hit, thus the adhesion of the paint film against the impact (impact-resistance) will be improved. The elongation at break is preferably 85% or more, more preferably 90% or more. The upper limit of the elongation at break is preferably, but not limited to, about 400%, more preferably about 350%. If the elongation at break was more than 400%, the paint film becomes so soft that the wear-resistance may be lowered.

In the present invention, the use of the paint film having the maximum stress of 170 kgf/cm$^2$ (16.7 MPa) or more improves the wear-resistance of the paint film. The maximum stress of the paint film is preferably 180 kgf/cm$^2$ (17.6 MPa) or more, more preferably 184 kgf/cm$^2$ (18.0 MPa) or more. The upper limit of the maximum stress is preferably, but not limited to, about 400 kgf/cm$^2$ (39.2 MPa), more preferably about 350 kgf/cm$^2$ (34.3 MPa).

The maximum stress and the elongation at break are respectively the stress at the maximum value and the elongation when the specimen of the paint film is ruptured on the stress-strain curve. The stress-strain curve is obtained by measuring the paint film made from the aqueous paint at the cross head speed of 10 to 200 mm/min., preferably 50 mm/min., according to JIS-K7161. Since the maximum stress may be defined as the stress at the maximum value of the stress-strain curve, for example, if the stress at the yielding point of the stress-strain curve was the maximum value, the stress at the yielding point is the maximum stress, and if the stress at break of the paint film was maximum value, the stress at break is the maximum stress.

The paint film of the present invention is not limited, as long as the paint film has the above mechanical properties and is obtained from the aqueous paint. The paint film is preferably obtained from the two-component curing type aqueous paint. Herein, "aqueous paint" of the present invention includes both "water soluble paint" which is soluble in water and "water dispersible paint" which can be dispersed into water. In the present invention, the resin component of the paint film includes, for example, an acrylic resin, an epoxy resin, an urethane resin, a polyester resin, or a cellulose resin, and preferably includes the urethane resin obtained by curing a two-component curing type aqueous urethane paint containing an aqueous polyol and an aqueous polyisocyanate. The use of the two-component curing type urethane resin as the resin component of the paint film improves the wear-resistance and the durability. In addition, the urethane backbone has a high degree of chemical affinity with the cover material constituting the surface portion of the golf ball body, thus the excellent adhesion is obtained.

In the following, the two-component curing type aqueous urethane paint containing the aqueous polyol and the aqueous polyisocyanate, which is preferably used in the present invention, will be explained. The aqueous polyol used for the two-component curing type aqueous urethane paint is not limited, as long as the polyol is aqueous and has at least two hydroxyl groups. Examples of the aqueous polyol are an aqueous polyester polyol, an aqueous polyether polyol, an aqueous urethane polyol, an aqueous acrylic polyol, an aqueous alkyd resin, a polyvinyl alcohol, and a cellulose derivative such as hydroxyl ethylcellulose and carboxyl methylcellulose. The above aqueous polyol can be used individually or in combination of at least two of them. Among them, it is even more preferable to use the aqueous polyester polyol or the mixture of the aqueous polyester polyol and the aqueous acrylic polyol, because the aqueous polyester polyol improves the impact-resistance of the resulting urethane paint film and the aqueous acrylic polyol improves the weather resistance. More preferably, the aqueous polyol is the mixture of the aqueous polyester polyol and the aqueous acrylic polyol at the mass ratio of the aqueous polyester polyol:the aqueous acrylic polyol=4:1 to 10:1, since the resultant film is excellent in both mechanical properties (maximum stress, elongation at break) and weather resistance.

As described above, the aqueous polyester polyol includes a water-soluble polyester polyol and a water dispersible polyester polyol. Examples of the aqueous polyester polyol are a polyester polyol having a carboxyl group and a polyester polyol having a sulfonic acid group. Typically preferred as the aqueous polyester polyol is the aqueous polyester polyol having the carboxyl group, which will be soluble or dispersible into water by neutralizing the carboxyl group with a base.

The aqueous polyester polyol having the carboxyl group can be produced, according to the method well-known for producing the conventional polyester polyol. For example, the aqueous polyester polyol can be obtained by the polycondensation between a (low molecular weight) polyol and a polybasic acid.

The carboxyl group for making the polyester polyol aqueous can be introduced from either the polyol component or the polybasic acid component. A polyol component for introducing the carboxyl group into the polyester polyol includes, for example, dimethylol propionic acid, dimethylol butanoic acid, dihydroxyl propionic acid, or dihydroxyl succinic acid. The polyol component, other than the polyol component for introducing the carboxyl group, includes a well known polyol for preparing the polyester polyol. Examples of the well known polyol are a diol such as ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, dipropylene glycol, tripropylene glycol, 1,4-cyclohexanediol, and bisphenol A; or a triol such as glycerin and trimethylol propane. The above polyol can be used individually or in combination of at least two of them.

The polybasic acid component for introducing the carboxyl group into the polyester polyol includes, for example, trimellitic anhydride and pyromellitic anhydride. The polybasic acid, other than the polybasic acid for introducing the carboxyl group, includes a well known polybasic acid for preparing the polyester polyol. Examples of the well known polybasic acid are a dibasic acid such as succinic acid, adipic acid, azelaic acid, sebacic acid, dodecanedicarboxylic acid, maleic anhydride, fumaric acid, 1,3-cyclopentanedicarboxylic acid, 1,4-cyclohexanedicarboxylic acid, terephtalic acid, isophtalic acid, 1,4-naphtalenedicarboxylic acid, 2,5-naphtalenedicarboxylic acid, 2,6-naphtalenedicarboxylic acid, naphtalic acid (1,8-naphtalenedicarboxylic acid), and biphenyldicarboxylic acid. The above polybasic acid can be used individually or in combination of at least two of them.

The aqueous polyether polyol includes, for example, a polyethylene glycol.

The aqueous urethane polyol is not limited, as long as it has a urethane bond in the molecular chain thereof and a plurality of hydroxyl groups. The aqueous urethane polyol can be obtained by reacting the above aqueous polyester polyol and/or the aqueous polyether polyol with the polyisocyanate in such a molar ratio that the hydroxyl group of the polyol component is excess to the isocyanate group of the polyisocyanate.

The aqueous acrylic polyol includes, for example, an aqueous acrylic polyol where a (meth) acrylate having a hydroxyl group is copolymerized. Examples of the (meth) acrylate having a hydroxyl group are 2-hydroxyethyl (meth) acrylate, and hydroxypropyl (meth)acrylate. Examples of the other monomer component copolymerized into the acrylic polyol are well-known ethylenically unsaturated monomer such as (meth)acrylic acid, maleic acid, itaconic acid, methyl (meth)acrylate, ethyl (meth)acrylate, isopropyl (meth)acrylate and n-butyl (meth)acrylate.

The preparation of the aqueous acrylic polyol is not limited, and is conducted by, for example, copolymerizing the ethylenically unsaturated monomer having a carboxyl group such as (meth)acrylic acid, maleic acid, itaconic acid, and neutralizing the carboxyl group with the base, or by emulsion-polymerizing the ethylenically unsaturated monomer containing (meth)acrylate having the hydroxyl group in the presence of the surfactant.

The aqueous polyol preferably has hydroxyl value of not less than 25 mgKOH/g, more preferably not less than 30 mgKOH/g, and preferably has hydroxyl value of less than 100 mgKOH/g, more preferably not more than 95 mgKOH/g. If the aqueous polyol has hydroxyl value of less than 25 mgKOH/g, the adhesion between the paint film and the golf ball body will be lowered. While if the aqueous polyol has hydroxyl value of 100 mgKOH/g or more, the curing reaction with the aqueous polyisocyanate takes a longer time, resulting in the lower productivity. The hydroxyl value is determined, for example, by the potentiometric titration, according to JIS-K1557.

The aqueous polyol preferably has a weight average molecular weight of 4,000 or more, more preferably 5,000 or more, even more preferably 6,000 or more, and preferably has a weight average molecular weight of 20,000 or less, more preferably 17,000 or less, even more preferably 15,000 or less. If the weight average molecular weight is less than 4,000, it takes a longer time to dry the paint, resulting in the lower productivity, while if the weight average molecular weight is more than 20,000, the hydroxyl value becomes relatively low, thus the adhesion between the paint film and the golf ball body will be lowered. The molecular weight of the aqueous polyol is determined by Gel permeation chromatography using polystyrene as a standard material.

The preparation of the aqueous polyol liquid is not limited, and is conducted by, for example, neutralizing the carboxyl group with the base in the case of the polyol having a carboxyl group. The base for neutralizing the carboxyl group includes, for example, a primary amine such as ammonia, methylamine, and ethylamine; a secondary amine such as diethanol amine, dimethyl amine, and diethyl amine; a tertiary amine such as triethyl amine and triethanol amine; a hydroxide of alkali metal such as sodium hydroxide and potassium hydroxide. Further, in the cases of the aqueous polyether polyol having a polyethylene oxide chain, the polyvinyl alcohol, or the cellulose derivative, the aqueous liquid thereof is prepared just by mixing and agitating them with water. If necessary, the solubilization may be conducted at the elevated temperature.

The aqueous polyol liquid preferably has the concentration of 20 mass % or more, more preferably 25 mass % or more, while preferably has the concentration of 65 mass % or less, more preferably 60 mass % or less. If the concentration is less than 20 mass %, the curing reaction between the aqueous polyol and the polyisocyanate of the curing agent tends to be slow. If the concentration is more than 65 mass %, the viscosity will be higher, resulting in the lower painting-workability.

In the present invention, as the curing agent for the aqueous polyol of the two-component curing type aqueous urethane paint, preferably used is the aqueous polyisocyanate. The use of the aqueous polyisocyanate allows a homogenous curing reaction between the aqueous polyol and the aqueous polyisocyanate.

The aqueous polyisocyanate is not limited, as long as the polyisocyanate is modified to be aqueous (water soluble or water dispersible) Examples of the aqueous polyisocyanate include an aqueous polyisocyanate modified with polyoxyalkylene ether alcohol.

The polyisocyanate component constituting the aqueous polyisocyanate includes, for example, an aromatic polyisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI) and paraphenylene diisocyanate (PPDI); and an alicyclic or aliphatic polyisocyanate such as 4,4'-dicyclohexylmethane diisocyanate (hydrogenated MDI), hydrogenated xylylenediisocyanate ($H_6$XDI) hexamethylene diisocyanate (HDI), and isophorone diisocyanate (IPDI). The polyisocyanate can be used either alone or in combination of two or more. Among them, non-yellowing type polyisocyanate (TMXDI, XDI, HDI, $H_6$XDI, IPDI, $H_{12}$MDI) are preferable in view of weather resistance, and the aqueous hexamethylene diisocyanate is more preferable. Specific examples of the aqueous polyisocyanate are CR-60N available from DAINIPPON INK AND CHEMICALS, INC., Coronate C3062, C3053 available from NIPPON POLYURETHANE INDUSTRY, and Bayhdur 3100 available from SUMITOMO BAYER URETHANE, and I-3 available from SHINTO PAINT.

The mixing ratio (NCO/OH) of the aqueous polyisocyanate to the aqueous polyol is not limited. NCO/OH (molar ratio) is preferably not less than 1.2, more preferably not less than 1.3, even more preferably not less than 1.5, while the NCO/OH (molar ratio) is preferably not more than 2.0, more preferably not more than 1.8. If NCO/OH (molar ratio) is less than 1.2, the curing reaction tends to be insufficient. The insufficient curing reaction causes the tackiness of the resulting paint film, thus the dust and the dirt tend to adhere to the resultant paint film. While if the molar ratio of NCO/OH is greater than 2.0, the residual isocyanate group tends to react with moisture, thereby generating $CO_2$. As a result, the air bubble tends to be contained in the paint film.

The two-component curing type urethane paint may further include an organic solvent in addition to the above aqueous polyol and the aqueous polyisocyanate, since the organic solvent improves the mutual dispersibility between the aqueous polyol and the aqueous polyisocyanate, thereby promoting the curing reaction. The organic solvent includes, for example, acetone, methyl ethyl ketone, ethyl acetate, N,N-dimethylformamide, N-metylpyrrolidone, and methoxybutyl acetate. As the above organic solvent, it is preferable to use so called "film forming additive". The film forming additive can enhance the film forming ability of the paint film, thereby improving the properties of the resultant paint film. Further, since the film forming additive is less volatile, it is possible to reduce the amount of the volatile organic solvent.

Examples of the film forming additive are a glycolic ether type solvent such as ethyleneglycol monomethylether, ethyleneglycol monoethylether, ethyleneglycol monobutylether, ethyleneglycol monohexylether, ethyleneglycol 2-ethylhexylether, propyleneglycol butylether, dipropyleneglycol butylether, diethyleneglycol monoethylether, and diethyleneglycol monobutylether; a glycolic ester type solvent such as ethyleneglycol monomethylether acetate, ethyleneglycol monoethylether acetate, propyleneglycol monomethylether acetate, diethyleneglycol monoethylether acetate, and diethyleneglycol monobutylether acetate. The above organic solvent and the film forming additive can be used either alone or in combination of at least two of them.

The amount of the organic solvent contained in the two-component curing type aqueous paint is preferably 5 mass % or more, more preferably 12 mass % or more, even more preferably 14 mass % or more, and is preferably 20 mass % or less, more preferably 18 mass % or less, even more preferably 16 mass % or less. Because the use in an amount of more than 20 mass % does not meet the object to reduce the volatile component as well as raises the raw material cost of the paint. While if the amount is less than 5 mass %, the film forming ability and the mutual dispersibility between the aqueous polyol and the aqueous polyisocyanate tend to be lowered.

The organic solvent or the film forming additive may be contained into either of a base resin including an aqueous polyol and the like, and the curing agent including the aqueous polyisocyanate.

The two-component curing type urethane paint preferably used in the present invention may further include an additive such as a pigment, an UV absorber, an antioxidant, a light-stabilizer, a fluorescent brightener, an anti-blocking agent, a leveling agent, and a slipping agent, which are conventionally used for the golf ball paint, in addition to the above base resin component.

According to the present invention, the paint film is preferably formed by applying and drying the above two-component curing type aqueous paint on the surface of the golf ball body. The method of applying the above paint is not limited, and includes the conventional method for the two-component curing type paint. For example, the base resin containing the aqueous polyol liquid and the curing agent containing the aqueous polyisocyanate are mixed, then the electrostatic coating method, or spray method using an air spray gun can be employed for the application of the golf ball. Further, the surface of the golf ball may be subjected to the surface treatment such as cleaning or sandblast prior to the coating. In the case of applying the paint with the spray gun, the base resin containing the aqueous polyol liquid and the curing agent containing the aqueous polyisocyanate may be mixed bit by bit, or the base resin containing the aqueous polyol liquid and the curing agent containing the aqueous polyisocyanate are fed with the respective pumps and continuously mixed in a constant ratio through the static mixer located in the stream line just before the spray gun. Alternatively, the base resin containing the aqueous polyol liquid and the curing agent containing the aqueous polyisocyanate can be air-sprayed respectively with the spray gun having the device for controlling the mixing ratio thereof. Subsequently, the two-component curing type aqueous urethane paint coated on the surface of the golf ball body is dried, for example, at the temperature of less than 50° C. for 0.5 to 2 hours to obtain the paint film.

The paint film after dried, without limitation, preferably has a thickness of 5 μm to 25 μm. If the thickness is less than 5 μm, the paint film will be easily worn out by the continuous use. While if the thickness is more than 25 μm, the dimple will not work efficiently, thus the flying performance of the resultant golf ball tends to be low. In addition, the paint film may have a single layer structure or a multi layer structure having at least two layers, as long as the thickness of the paint film falls within the above range. The paint film preferably has the single layer structure, because the painting process can be simplified and the paint film in the present invention shows the excellent paint properties even in the single layer structure. The paint film can be the outermost clear paint layer, or can be the enamel paint layer containing the pigment. In the case that the paint film is the enamel paint layer, the clear paint layer can be further formed thereon.

The golf ball of the present invention has no limitation on its structure and includes a one-piece golf ball, a two-piece golf ball, a multi-piece golf ball comprising at least three layers, and a wound-core golf ball. The present invention can be applied to all types of the golf ball. In the following, the method for preparing the golf ball of the present invention will be explained based on the embodiment of the two-piece golf ball, but the present invention is not limited to the two-piece golf ball and the process explained below.

The present invention can employ any core which is well-known as the core for the two-piece golf ball. The core of the two-piece golf ball, for example, without limitation, is preferably a molded body which is formed by vulcanizing a rubber composition. The rubber composition preferably comprises a base rubber, a co-crosslinking agent, and a crosslinking initiator.

Examples of the base rubber are butadiene rubber (BR), ethylene-propylene-diene terpolymer (EPDM), isoprene rubber (IR), styrene-butadiene rubber (SBR), and acrylonitrile-butadiene rubber (NBR). Among them, butadiene rubber, particularly cis-1,4-polybutadiene, is preferable in view of its superior repulsion property. Typically preferred is the high cis-polybutadiene rubber having cis-1,4 bond in a proportion of not less than 40%, more preferably not less than 70%, even more preferably not less than 90%.

The co-crosslinking agent used in the present invention includes, for example, an $\alpha,\beta$-unsaturated carboxylic acid or a metal salt thereof. Typically preferred is the $\alpha,\beta$-unsaturated carboxylic acid having 3 to 8 carbon atoms such as acrylic acid and methacrylic acid or the metal salt thereof. As the metal forming the metal salt of the $\alpha,\beta$-unsaturated carboxylic acid, a monovalent or divalent metal such as zinc, magnesium, calcium, aluminum and sodium is preferably used. Among them, zinc is preferable, because it can impart the higher repulsion property to the golf ball. The amount of the co-crosslinking agent to be blended in the rubber composition is preferably not less than 20 parts by mass, more preferably not less than 25 parts by mass, and preferably not more than 50 parts by mass, more preferably not more than 40 parts by mass based on 100 parts by mass of the base rubber.

As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. The amount of the organic peroxide to be blended in the rubber composition is preferably not less than 0.2 part by mass, more preferably not less than 0.3 part by mass, and preferably not more than 1.5 parts by mass, more preferably not more than 1.0 part by mass based on 100 parts by mass of the base rubber.

The rubber composition for the core may further contain a specific gravity adjusting agent such as zinc oxide and barium sulfate, an antioxidant, a color powder, and the like, as required.

The core is formed by press-molding the above rubber composition into the spherical body at the heating conditions. The conditions for the press-molding should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

The core thus obtained is covered with the cover composition to form a golf ball body. The cover composition, for example, includes a thermoplastic resin such as an ionomer resin, and an urethane resin; a two-component curing type urethane resin; a balata and a hard rubber. Preferably used is the thermoplastic urethane resin, or the two-component curing type urethane resin, since the adhesion of the cover to the two-component curing type aqueous urethane resin constituting the paint film will be enhanced. Further, when forming the cover to obtain a golf ball body, the cover can be formed with a multiplicity of concavities, which are so called "dimple", at the surface thereof. As required, the surface of the golf ball can be subjected to grinding treatment such as sandblast in order to improve the adhesion of the mark and the paint film.

Although the method for preparing the golf ball is explained based on the embodiment of the two-piece golf ball, the wound core can be used for preparing a wound golf ball, and at least one intermediate layer can be formed between the core and the cover for preparing the multi-piece golf ball including at least three layers.

For preparing a wound golf ball, a conventional wound core can be used in the present invention. The wound core comprises a center and a rubber thread layer which is formed by winding a rubber thread around the center in an elongated state. Examples of the center are a liquid center and a solid center formed of rubber. In the present invention, the rubber thread, which is conventionally used for winding around the center, can be adopted for winding around the center. The rubber thread, for example, is obtained by vulcanizing a rubber composition including a natural rubber, or a mixture of natural rubber and a synthetic polyisoprene, a sulfur, a vulcanization auxiliary agent, a vulcanization accelerator, and an antioxidant. The rubber thread is wound around the center in elongation of about 10 times length to form the wound core.

When preparing a multi-piece golf ball comprising at least three layers, the intermediate layer includes, for example, a thermoplastic resin such as a polyurethane resin, an ionomer resin, Nylon, and a polyethylene; a thermoplastic elastomer such as a polystyrene elastomer, a polyolefin elastomer, a polyurethane elastomer, a polyester elastomer, and a polyamide elastomer.

Examples of the ionomer resin are one prepared by neutralizing at least a part of carboxyl groups in a copolymer composed of ethylene and $\alpha,\beta$-unsaturated carboxylic acid with a metal ion, and one prepared by neutralizing at least a part of carboxyl groups in a terpolymer composed of ethylene, $\alpha,\beta$-unsaturated carboxylic acid and $\alpha,\beta$-unsaturated carboxylic acid ester with a metal ion.

Examples of the $\alpha,\beta$-unsaturated carboxylic acid are acrylic acid, and methacrylic acid. Examples of the $\alpha,\beta$-unsaturated carboxylic acid ester are methyl ester, ethyl ester, propyl ester, n-butyl ester, isobutyl ester and the like of acrylic acid, and methacrylic acid. The metal for neutralizing the carboxyl group includes alkali metal such as sodium, potassium, and lithium; or alkali earth metal such as magnesium, calcium, and lithium; or divalent transition metal such as zinc, and copper. Further, the above ionomer resin can be used as the mixture thereof in order to obtain the desired resilience and hardness.

The intermediate layer may further include a gravity adjusting agent such as barium sulfate and tungsten, an antioxidant, a pigment and the like.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation Method]

(1) Mechanical Properties of the Paint Film Made from the Aqueous Paint

The base resin and the curing agent were mixed to prepare a two-component curing type aqueous paint and the two-component curing type aqueous paint was cured at 40° C. for 4 hours to obtain a paint film. The dumbbell specimens were stamped out from the paint film, and the mechanical properties thereof were measured using a tensile test device of SHIMAZU CORPORATION, according to JIS-K7161. In the case that the aqueous paint contains an additive such as a viscosity modifier, the mechanical properties of the paint film including the viscosity modifier are to be measured.
Thickness of the paint film: 0.05 mm
Crosshead Speed: 50 mm/min.

(2) Impact-Resistance of the Paint Film (Adhesion of the Paint Film against the Impact)

Each painted golf ball was hit 150 times repeatedly with a five iron attached to a swing robot manufactured by TRUETEMPER CO, at the head speed of 34 m/sec. The impact-resistance was evaluated based on the following criteria.
E(Excellent): None of the paint film peeled off.
G(Good): The area where the paint film peeled off was not more than 5% with respect to the whole area of the paint film.
F(Fair): The area where the paint film peeled off was from 5% (exclusive) to 20% with respect to the whole area of the paint film.
P(Poor): The area where the paint film peeled off was more than 20% with respect to the whole area of the paint film.

(3) Wear-Resistance of the Paint Film (Adhesion of the Paint Film against Frictions)

Each painted golf ball was subjected to brushing wash for 1 hour in the potato peeler having the inside surface covered with the brush. The peeling condition of the paint film was visually observed, and evaluated according to the following criteria.
E(Excellent): None of the paint film peeled off.
G(Good): The area where the paint film peeled off was not more than 5% with respect to the whole area of the paint film.
F(Fair): The area where the paint film peeled off was from 5% (exclusive) to 20% with respect to the whole area of the paint film.
P(Poor): The area where the paint film peeled off was more than 20% with respect to the whole area of the paint film.

[Production of the Two-piece Golf Ball]

(1) Preparation of Solid Core

The rubber composition shown in Table 1 was kneaded and pressed with upper and lower molds each having a spherical cavity at the heating condition of 160° C. for 13 minutes to obtain the solid core in a spherical shape having a diameter of 39.3 mm.

TABLE 1

| Core formulation | Amount(parts) |
| --- | --- |
| Polybutadiene rubber | 100 |
| Zinc oxide | 5.6 |
| Zinc acrylate | 22.0 |
| Calcium carbonate | 21.0 |
| Dicumyl peroxide | 1.85 |

Note on Table 1:
Polybutadiene rubber: BR-11 (cis content: 96%) available from JSR.
Zinc acrylate: "ZNDA-90S" produced by NIHON JYORYU KOGYO.
Zinc oxide: "Ginrei R" produced by Toho-Zinc.
Calcium carbonate: "BF300" produced by BIHOKU FUNKA KOGYO
Dicumyl peroxide: "Percumyl D" produced by NOF Corporation.

(2) Preparation of the Cover Material

The materials shown in Table 2 were mixed using a twin-screw kneading extruder to obtain the cover composition in the form of pellet. The extrusion was conducted in the following conditions:
screw diameter=45 mm,
screw revolutions=200 rpm,
screw L/D=35, and
the cover composition was heated to from 200° C. to 260° C. at the die position of the extruder.

TABLE 2

| Cover material | Cover material A | Cover material B |
| --- | --- | --- |
| Himilan 1605 | 40 | — |
| Himilan 1706 | 30 | — |
| Himilan 1707 | 30 | — |
| Elastollan XNY97A | — | 100 |
| Titanium oxide | 2 | 2 |

Amount: parts
Notes on Table 2:
HIMILAN 1605: an ionomer resin of a sodium ion-neutralized ethylene-methacrylic acid copolymer, available from MITSUI-DUPONT POLY-CHEMICAL.
HIMILAN 1706: an ionomer resin of a zinc ion-neutralized ethylene-methacrylic acid copolymer, available from MITSUI-DUPONT POLY-CHEMICAL.
HIMILAN 1707: an ionomer resin of a sodium ion-neutralized ethylene-methacrylic acid copolymer, available from MITSUI-DUPONT POLY-CHEMICAL.
Elastollan XNY97A: a $H_{12}$MDI-PTMG type thermoplastic polyurethane available from BASF Japan.

(3) Preparation of the Golf Ball Body

The cover composition thus prepared was directly injection-molded onto the core to form the cover, thereby obtaining the two-piece golf ball body having a diameter of 42.7 mm. The upper and lower molds for forming the cover have a spherical cavity with dimples. The part of the dimples can serve as a hold pin which is retractable. When forming the golf ball body, the hold pins were protruded to hold the core, and the resin heated at 210° C. was charged into the mold held under the pressure of 80 tons for 0.3 second. After the cooling for 30 seconds, the molds were opened and then the golf ball body was discharged.

The surface of the obtained golf ball was subjected to the sandblast treatment, the mark was printed, and then the two-component curing type aqueous urethane paints shown in Table 3 were respectively sprayed thereto with the air-gun. The paint was dried in the oven heated at 40° C. to form the paint film having the thickness of 10 μm. The impact-resistance and wear-resistance of the obtained paint film were evaluated in terms of each golf ball. The results were also shown in Table 3. In the table the base resin were mixed with the curing agent in the aqueous paint such that NCO of the curing agent and OH of the base resin satisfies NCO/OH=1.5

TABLE 3

|  | Golf ball No. | | | | | | |
| --- | --- | --- | --- | --- | --- | --- | --- |
|  | No. 1 | No. 2 | No. 3 | No. 4 | No. 5 | No. 6 | No. 7 |
| Cover material | A | A | A | A | A | B | A |
| Composition of aqueous paint (parts) | — | — | — | — | — | — | — |
| Base resin | — | — | — | — | — | — | — |
| Aqueous polyol 1 | 100 | 54.5 | 55.6 | 28.6 | — | 55.6 | — |
| Aqueous polyol 2 | — | 45.5 | 44.4 | 71.4 | 100 | 44.4 | — |
| Aqueous polyol 3 | — | — | — | — | — | — | 100 |
| Polyester polyol/Acrylic polyol *[1] | — | 10/1 | 8/1 | 6/1 | 4/1 | 8/1 | — |
| Viscosity modifier | 0.2 | 0.2 | 0.2 | 0.2 | 0.2 | 0.2 | 0.2 |
| Water | 215 | 215 | 215 | 215 | 215 | 215 | 215 |
| Curing agent | — | — | — | — | — | — | — |
| Aqueous hexamethylene diisocyanate | 75 | 75 | 75 | 75 | 75 | 75 | 75 |
| 3-methoxybutyl acetate | 25 | 25 | 25 | 25 | 25 | 25 | 25 |
| Properties of paint film | — | — | — | — | — | — | — |
| Maximum stress (kgf/cm$^2$) | 135 | 170 | 184 | 187 | 190 | 184 | 330 |
| Elongation at break (%) | 125 | 110 | 100 | 92 | 85 | 100 | 30 |
| Impact resistance | E | E | E | G | G | E | P |
| Wear resistance | F | G | E | E | E | E | E |

*[1] Mass ratio of Polyester polyol/Acrylic polyol
Notes on Table 3
Aqueous polyol 1: an aqueous polyester polyol having OH value of 33 mg KOH/g, available from SHINTO PAINT.
Aqueous polyol 2: a mixture of an aqueous polyester polyol/an aqueous acrylic polyol (aqueous polyester polyol/acrylic polyol = 4/1, mass ratio) having OH value of 66 mg KOH/g, available from SHINTO PAINT.
Aqueous polyol 3: an aqueous acrylic polyol having OH value of 50 mg KOH/g available from SHINTO PAINT.
Curing agent: aqueous hexamethylene diisocyanate available from SHITO PAINT.

Golf ball No. 1 is the case that the maximum stress was as low as 135 kgf/cm$^2$, and the wear-resistance of the paint film was lowered. Golf balls No. 2 to No. 6 are the cases that the paint film of the golf balls each satisfied with the maximum stress of 170 kgf/cm$^2$ or more and the elongation at break of 80% or more, and were excellent in both impact-resistance and wear-resistance. Golf ball No. 7 is the case that the elongation at break of the paint film was as low as 30%, the impact-resistance of the paint film was remarkably lowered. According to the present invention, it is possible to provide a golf ball having a paint film obtained from an environment friendly aqueous paint that is excellent in the impact-resistance and the wear-resistance.

This application is based on Japanese Patent application No. 2,004-182,841 filed on Jun. 21, 2004, the contents of which are hereby incorporated by reference.

What is claimed is:

1. A golf ball having a paint film on a surface of a golf ball body, wherein
    the paint film is obtained by curing a two-component curing type aqueous urethane paint containing an aqueous polyol and an aqueous polyisocyanate,
    the aqueous polyol is a mixture of an aqueous polyester polyol and an aqueous acrylic polyol wherein the mass ratio of the aqueous polyester polyol to the aqueous acrylic polyol ranges from 4:1 to 10:1, and
    the paint film has an elongation at break of 80% or more and maximum stress of 170 kgf/cm$^2$ (16.7 MPa) or more.

2. The golf ball according to claim 1, wherein the two-component curing type aqueous urethane paint contains an aqueous polyol and an aqueous polyisocyanate at a molar ratio of an isocyanate group of the aqueous polyisocyanate to a hydroxyl group of the aqueous polyol (NCO/OH) of from 1.2 to 2.0.

3. The golf ball according to claim 1, wherein the aqueous polyisocyanate is an aqueous hexamethylene diisocyanate.

4. The golf ball according to claim 1, wherein the aqueous polyol has hydroxyl value of from 25 mgKOH/g to 100 mgKOH/g (exclusive).

5. The golf ball according to claim 1, wherein the aqueous polyol has a weight average molecular weight of 4,000 to 20,000.

6. The golf ball according to claim 1, wherein the two-component curing type aqueous urethane paint contains a solvent.

7. The golf ball according to claim 6, wherein the solvent is a film forming additive.

8. The golf ball according to claim 1, wherein the golf ball body comprises a cover containing a urethane resin as a base resin.

9. A golf ball having a paint film on a surface of a golf ball body, wherein
    the paint film is obtained by curing a two-component curing type aqueous urethane paint containing an aqueous polyol and an aqueous polyisocyanate at the molar ratio of an isocyanate group of the aqueous polyisocyanate to a hydroxyl group of the aqueous polyol (NCO/OH) of from 1.2 to 2.0,
    the paint film has an elongation at break of 80% or more and maximum stress of 170 kgf/cm$^2$ (16.7 MPa) or more, and
    the aqueous polyol is a mixture of an aqueous polyester polyol and an aqueous acrylic polyol at a mass ratio of the aqueous polyester polyol to the aqueous acrylic polyol equal to 4:1 to 10:1.

10. The golf ball according to claim 9, wherein the golf ball body has a cover containing a urethane resin as a base resin.

* * * * *